US012808737B2

(12) United States Patent
Kobayashi et al.

(10) Patent No.: US 12,808,737 B2
(45) Date of Patent: Nov. 24, 2026

(54) MULTILAYER ELECTRODE, PIEZORESISTIVE FILM WITH ELECTRODE, AND PRESSURE SENSOR

(71) Applicant: TDK CORPORATION, Tokyo (JP)

(72) Inventors: Masanori Kobayashi, Tokyo (JP); Masamitsu Haemori, Tokyo (JP); Ken Unno, Tokyo (JP); Tetsuya Sasahara, Tokyo (JP); Kohei Nawaoka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 225 days.

(21) Appl. No.: 18/623,315

(22) Filed: Apr. 1, 2024

(65) Prior Publication Data

US 2024/0255371 A1 Aug. 1, 2024

Related U.S. Application Data

(63) Continuation of application No. PCT/JP2021/037202, filed on Oct. 7, 2021.

(51) Int. Cl.
*G01L 9/04* (2006.01)

(52) U.S. Cl.
CPC .................................... *G01L 9/04* (2013.01)

(58) Field of Classification Search
CPC . G01L 9/04; G01L 1/22; G01L 1/2287; G01L 1/26; G01B 7/16
See application file for complete search history.

(56) References Cited

U.S. PATENT DOCUMENTS

| | | | | |
|---|---|---|---|---|
| 8,833,174 | B2 * | 9/2014 | Moore | G01L 5/008 73/776 |
| 9,872,624 | B2 * | 1/2018 | Fuji | A61B 5/02141 |
| 12,474,225 | B2 * | 11/2025 | Kobayashi | G01L 19/0627 |
| 2008/0250863 | A1 * | 10/2008 | Moore | H10N 30/302 29/25.35 |
| 2015/0001650 | A1 * | 1/2015 | Matsunami | G01L 9/0045 438/51 |
| 2021/0210408 | A1 | 7/2021 | Kitazumi et al. | |

FOREIGN PATENT DOCUMENTS

| | | | |
|---|---|---|---|
| JP | H06-213612 | A | 8/1994 |
| JP | 2018-091848 | A | 6/2018 |
| WO | 2020/004567 | A1 | 1/2020 |

OTHER PUBLICATIONS

Apr. 9, 2024, International Preliminary Report on Patentability issued in International Patent Application No. PCT/JP2021/037202.
Aug. 7, 2026 Office Action issued in Chinese Patent Application No. 202180102998.4.

* cited by examiner

*Primary Examiner* — Francis C Gray
(74) *Attorney, Agent, or Firm* — Oliff PLC

(57) ABSTRACT

There is provided a multilayer electrode including a contact layer capable of being superposed on a piezoresistive film; a diffusion prevention layer superposed on the contact layer; and a mounting layer superposed on the diffusion prevention layer, in which the diffusion prevention layer contains a transition element belonging to the fifth or sixth periods.

9 Claims, 7 Drawing Sheets

MULTILAYER ELECTRODE, PIEZORESISTIVE FILM WITH ELECTRODE, AND PRESSURE SENSOR

CROSS-REFERENCE TO RELATED APPLICATIONS

The present application is a continuation application of PCT application No. PCT/JP2021/037202 filed on Oct. 7, 2021. The disclosures of these applications are hereby incorporated by reference in their entirety.

BACKGROUND

Technical Field

The present disclosure relates to a multilayer electrode provided on a piezoresistive film, a piezoresistive film with electrode, and a pressure sensor including the same.

Description of the Related Art

As a piezoresistive film used for a device such as a pressure sensor, a film containing Cr and Al has been proposed. Such a piezoresistive film is reported to have excellent properties particularly at a high temperature.

In addition, an electrode layer for wiring with an external circuit is provided on such a piezoresistive film. Such an electrode layer preferably has excellent bondability to both a piezoresistive film and a wiring material, and for example, a multilayer electrode in which layers are layered has been proposed (see JP 2018-91848 A and the like).

CITATION LIST

Patent Literature

Patent Literature 1: JP 2018-91848 A

SUMMARY

However, an electrode layer for a piezoresistive film according to the related-art has a disadvantage that adhesive force to wiring is reduced when exposed to a high temperature environment even when bondability at room temperature is excellent.

In addition, in a case of using a film containing Cr and Al as the piezoresistive film, it is desirable to provide a multilayer electrode for a piezoresistive film or the like that exhibits excellent adhesive force to wiring even after being exposed to a high temperature environment.

A multilayer electrode according to the present disclosure includes a contact layer capable of being superposed on a piezoresistive film, a diffusion prevention layer superposed on the contact layer, and a mounting layer superposed on the diffusion prevention layer, in which the diffusion prevention layer contains a transition element belonging to the fifth or sixth period.

DETAILED DESCRIPTION

Figure 1:
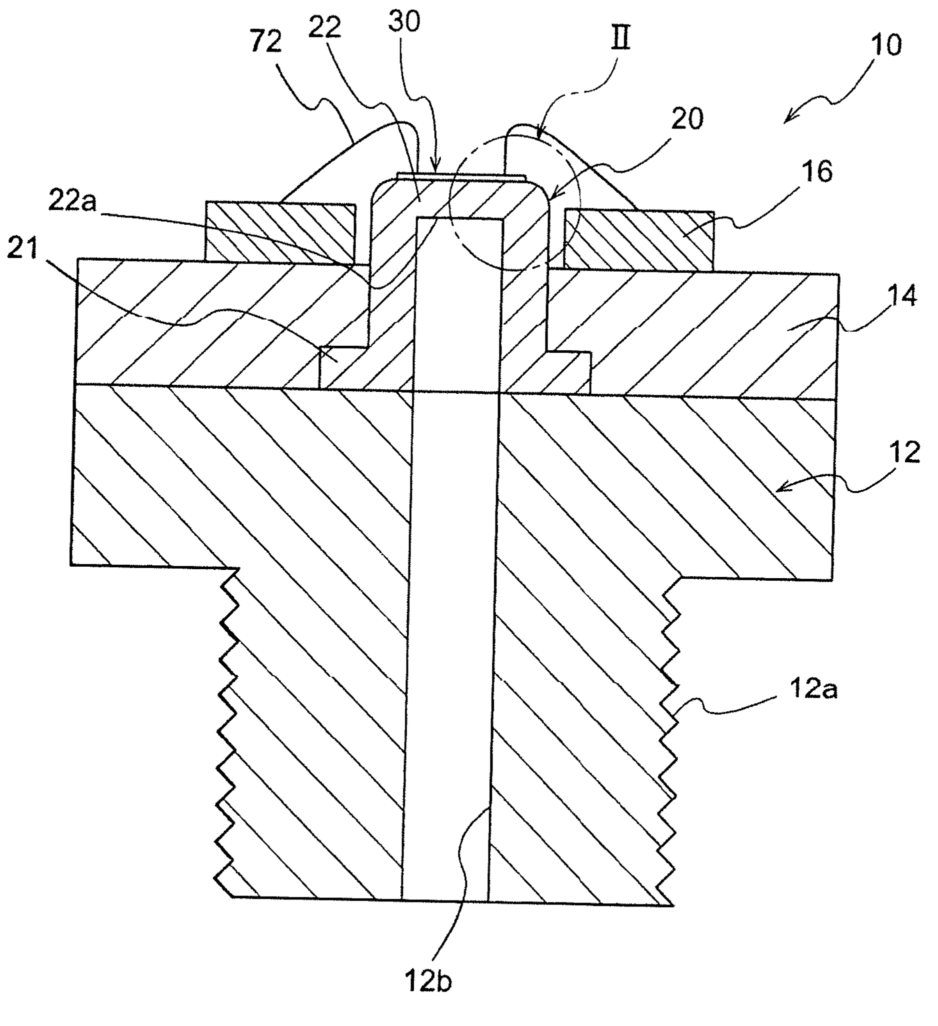
FIG. 1 is a schematic cross-sectional view of a pressure sensor according to an embodiment of the present disclosure.

Hereinafter, the present disclosure will be described based on embodiments illustrated in the drawings.

FIG. 1 is a schematic cross-sectional view of a pressure sensor 10 using a multilayer electrode 36 (see FIG. 2) according to an embodiment of the present disclosure. As illustrated in FIG. 1, the pressure sensor 10 includes a membrane 22 that deforms according to pressure. In the present embodiment, the membrane 22 is configured by an end wall formed at one end of a hollow cylindrical stem 20. The other end of the stem 20 is an open end of a hollow portion, and the hollow portion of the stem 20 communicates with a flow path 12*b* of a connecting member 12.

In the pressure sensor 10, a fluid introduced into the flow path 12*b* is guided from the hollow portion of the stem 20 to an inner surface 22*a* of the membrane 22, and a fluid pressure acts on the membrane 22. The stem 20 is formed of, for example, a metal such as stainless steel.

A flange portion 21 is formed around the open end of the stem 20 so as to protrude outward from an axial core of the stem 20. The flange portion 21 is sandwiched between the connecting member 12 and a pressing member 14, and the flow path 12*b* leading to the inner surface 22*a* of the membrane 22 is sealed.

The connecting member 12 has a screw groove 12*a* for fixing the pressure sensor 10. The pressure sensor 10 is fixed to a pressure chamber or the like in which a fluid to be measured is sealed via the screw groove 12*a*. As a result, the flow path 12*b* formed inside the connecting member 12 and the inner surface 22*a* of the membrane 22 in the stem 20 communicate airtightly with the pressure chamber in which the fluid to be measured exists.

A circuit board 16 is attached to an upper surface of the pressing member 14. The circuit board 16 has a ring-shaped surrounding the periphery of the stem 20, and the shape of the circuit board 16 is not limited thereto. The circuit board 16 incorporates, for example, a circuit to which a detection signal from a piezoresistive film with electrode 30 is transmitted.

As illustrated in FIG. 1, the piezoresistive film with electrode 30 is provided in an outer surface 22*b* of the membrane 22. The piezoresistive film with electrode 30 and the circuit board 16 are connected by intermediate wiring 72 by wire bonding or the like.

Figure 2:
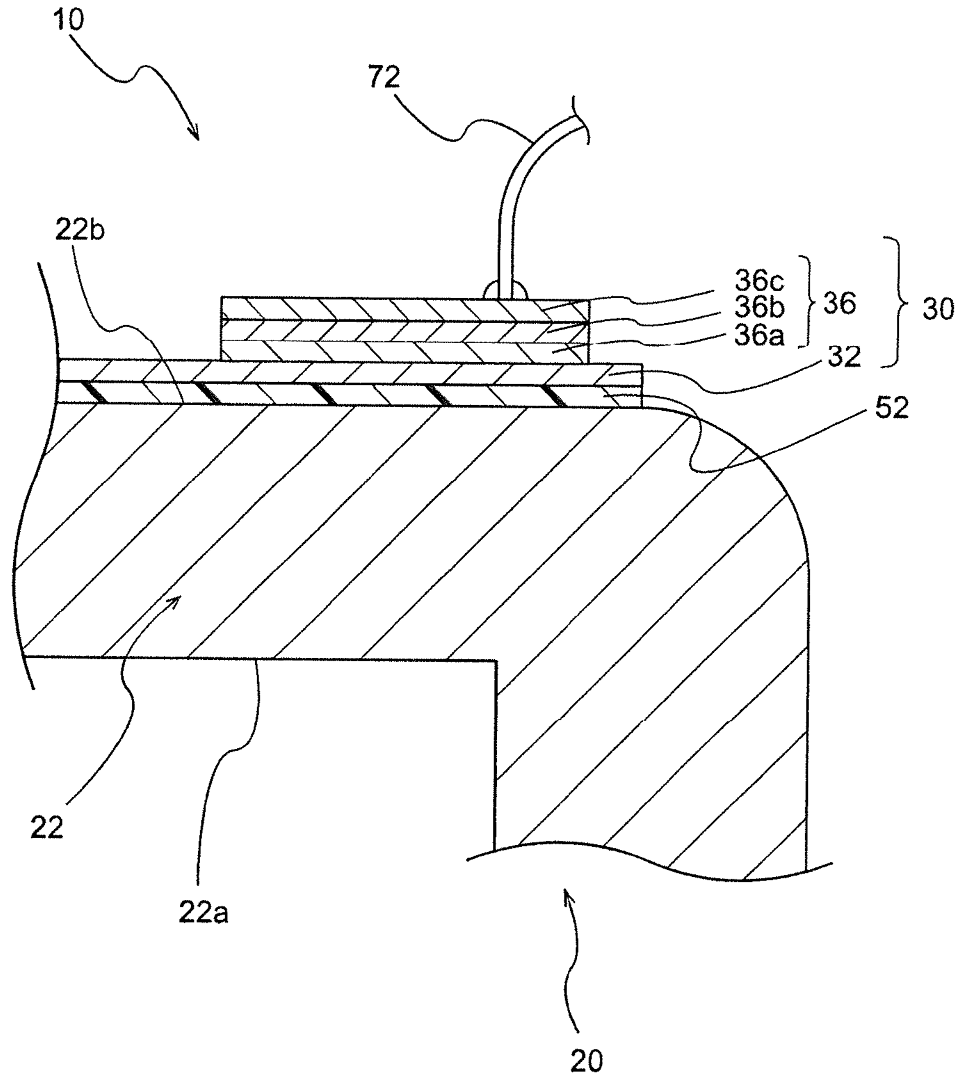
FIG. 2 is an enlarged cross-sectional view of a portion indicated by II in FIG. 1.

FIG. 2 is a schematic view illustrating an enlarged part of the piezoresistive film with electrode 30 included in the pressure sensor 10 illustrated in FIG. 1. As illustrated in FIG. 2, the piezoresistive film with electrode 30 includes a piezoresistive film 32 and a multilayer electrode 36 for a piezoresistive film (hereinafter, also simply referred to as a "multilayer electrode").

As illustrated in FIG. 2, the piezoresistive film 32 is provided on the outer surface 22*b* of the membrane 22 with a base insulating layer 52 interposed therebetween.

The base insulating layer 52 is formed so as to cover substantially the entire outer surface 22*b* of the membrane 22, and is formed of, for example, silicon oxide, silicon nitride, silicon oxynitride, or the like. A thickness of the base insulating layer 52 is preferably 10 m or less, and more preferably 1 to 5 μm. The base insulating layer 52 can be formed on the outer surface 22*b* of the membrane 22 by a vapor deposition method such as CVD.

Note that in a case where the outer surface 22*b* of the membrane 22 has insulating properties, the piezoresistive film 32 may be formed directly on the outer surface 22*b* of the membrane 22 without forming the base insulating layer 52. For example, in a case where the membrane 22 is formed of an insulating material such as alumina, the piezoresistive film 32 may be directly provided on the membrane 22.

Figure 3:
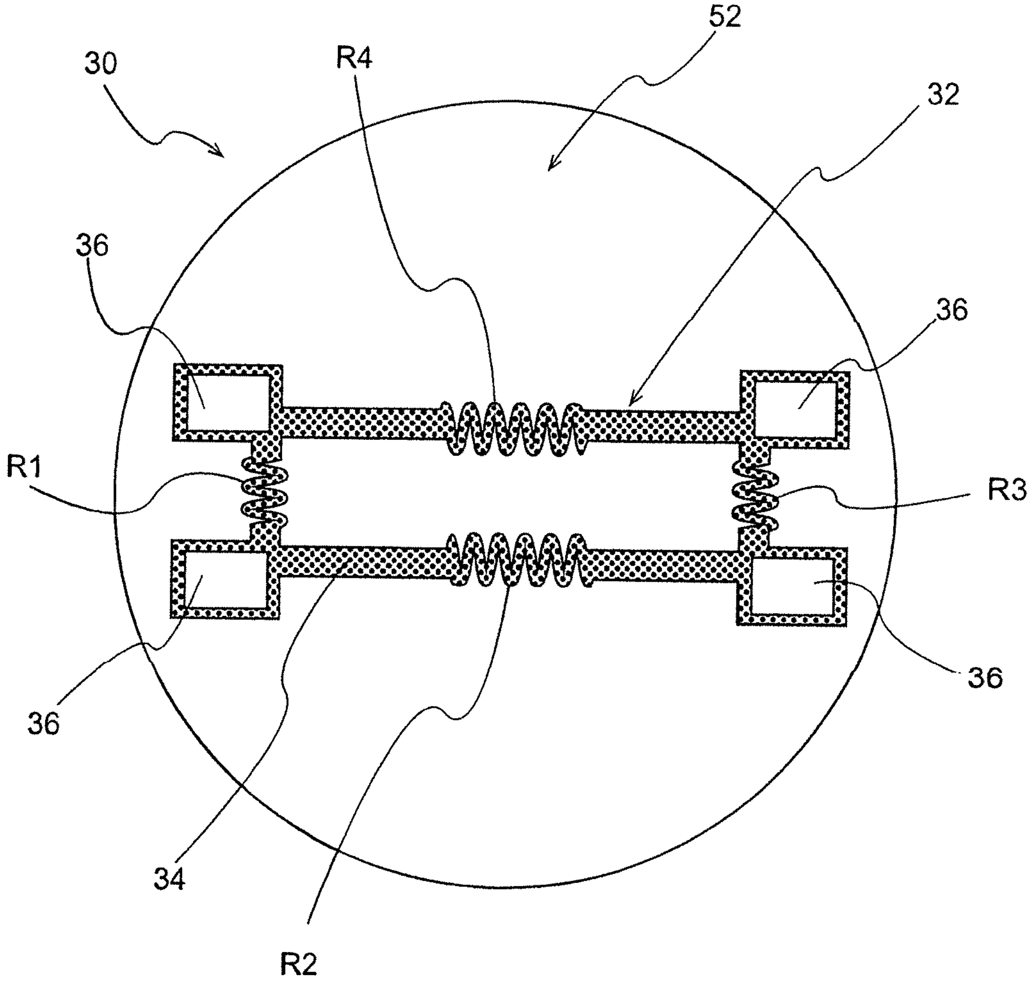
FIG. 3 is a schematic view showing an example of a pattern arrangement of a piezoresistive film with electrode included in the pressure sensor illustrated in FIG. 1.

As illustrated in FIG. 2, in the piezoresistive film with electrode 30, the multilayer electrode 36 may be provided on the piezoresistive film 32. FIG. 3 is a schematic plan view of the piezoresistive film with electrode 30 illustrated in FIGS. 1 and 2 as viewed from above, and illustrates a pattern arrangement of the piezoresistive film with electrode 30.

As illustrated in FIG. 3, in the piezoresistive film 32, a first resistor R1, a second resistor R2, a third resistor R3, and a fourth resistor R4 are formed in a predetermined pattern. The first to fourth resistors R1, R2, R3, and R4 generate distortion according to the deformation of the membrane 22, and a resistance value changes according to the deformation of the membrane 22. These first to fourth resistors R1 to R4 are connected to form a Wheatstone bridge circuit by electrical wiring 34.

The pressure sensor 10 illustrated in FIG. 1 detects the fluid pressure acting on the membrane 22 from an output of the Wheatstone bridge circuit by the first to fourth resistors R1 to R4 illustrated in FIG. 3. That is, the first to fourth resistors R1 to R4 are provided at positions where the membrane 22 illustrated in FIGS. 1 and 2 are deformed and distorted by the fluid pressure, and are configured so that the resistance value changes according to the amount of distortion.

The piezoresistive film 32 including the first to fourth resistors R1 to R4 can be produced, for example, by patterning a conductive film formed of a predetermined material. The piezoresistive film 32 contains Cr and Al, preferably contains 50 to 99 at % of Cr and 1 to 50 at % of Al, and more preferably contains 70 to 90 at % of Cr and 5 to 30 at % of Al. The piezoresistive film 32 contains Cr and Al, such that a temperature coefficient of resistance (TCR) or a temperature coefficient of sensitivity (TCS) in a high temperature environment is stabilized, and highly accurate pressure detection becomes possible. In addition, when the amounts of Cr and Al are set to be within predetermined ranges, it is possible to achieve both a high gauge factor and excellent temperature stability at higher levels.

The piezoresistive film 32 may contain elements other than Cr and Al, and for example, the piezoresistive film 32 may contain O or N. O or N contained in the piezoresistive film 32 may be an element remaining without being removed from a reaction chamber when the piezoresistive film 32 is formed, and may be incorporated into the piezoresistive film 32. In addition, O or N contained in the piezoresistive film 32 may be intentionally introduced into the piezoresistive film 32 by being used as an atmospheric gas during film formation or annealing.

In addition, the piezoresistive film 32 may contain a metal element other than Cr and Al. The piezoresistive film 32 contains a small amount of a metal other than Cr and Al or a nonmetallic element, and is subjected to a heat treatment such as annealing, such that the gauge factor and temperature properties may be improved. Examples of the metal other than Cr and Al or the nonmetallic element contained in the piezoresistive film 32 include Ti, Nb, Ta, Ni, Zr, Hf, Si, Ge, C, P, Se, Te, Zn, Cu, Bi, Fe, Mo, W, As, Sn, Sb, Pb, B, Ge, In, Tl, Ru, Rh, Re, Os, Ir, Pt, Pd, Ag, Au, Co, Be, Mg, Ca, Sr, Ba, Mn, and a rare earth element.

The piezoresistive film 32 can be formed by a thin film method such as sputtering or vapor deposition. The first to fourth resistors R1 to R4 can be formed, for example, by patterning a thin film into a meander shape. A thickness of the piezoresistive film 32 is not particularly limited, and is preferably 10 mun or less, and more preferably 0.1 to 1 m. Note that, as illustrated in FIG. 3, the electrical wiring 34 may be formed by patterning the piezoresistive film 32, or may be formed of a conductive film or a layer different from the piezoresistive film 32 (see FIG. 7).

As illustrated in FIG. 2, the multilayer electrode 36 is provided to be superposed on the piezoresistive film 32. As illustrated in FIG. 2, the multilayer electrode 36 is formed on a part of an upper surface of the piezoresistive film 32.

As illustrated in FIG. 3, the multilayer electrodes 36 are independently formed at four locations on the piezoresistive film 32. Each of the multilayer electrodes 36 is electrically connected to any two of the first to fourth resistors R1 to R4 via the electrical wiring 34. The multilayer electrode 36 is provided at a position where the first to fourth resistors R1 to R4 are not formed in the piezoresistive film 32.

Although not illustrated in FIG. 3, one end of the intermediate wiring 72 illustrated in FIGS. 1 and 2 is connected to each of the multilayer electrodes 36 illustrated in FIG. 3. That is, the output of the Wheatstone bridge circuit by the first to fourth resistors R1 to R4 is transmitted to the circuit board 16 illustrated in FIG. 1 via the multilayer electrode 36 and the intermediate wiring 72 (see FIGS. 1 and 2).

As illustrated in FIG. 2, the multilayer electrode 36 includes a contact layer 36*a* superposed on the piezoresistive film, a diffusion prevention layer 36*b* superposed on the contact layer 36*a*, and a mounting layer 36*c* superposed on the diffusion prevention layer 36*b*. The multilayer electrode 36 has a multilayer film structure of three or more layers formed of different materials. However, the multilayer electrode 36 is not limited to an electrode having a three-layer structure as illustrated in FIG. 2, and the multilayer electrode 36 may have a multilayer structure of four or more layers.

As illustrated in FIG. 2, the contact layer 36*a* at the lowermost layer in the multilayer electrode 36 is in direct contact with the piezoresistive film 32. The contact layer 36*a* secures ohmic connection with the piezoresistive film 32, and improves electrical properties of the piezoresistive film with electrode 30. In addition, the contact layer 36*a* secures adhesion strength between the piezoresistive film 32 and the multilayer electrode 36, and prevents film and layer peeling failures.

The contact layer 36*a* can be formed by a thin film method such as sputtering or vapor deposition. A thickness of the contact layer 36*a* is not particularly limited, and is, for example, 1 to 50 nm, and preferably 5 to 20 nm. The contact layer 36*a* preferably contains at least one of Cr, Ti, Ni, and Mo. Since these elements easily form an alloy with other metals, the contact layer 36*a* containing such elements can secure adhesion strength between the piezoresistive film 32 and the diffusion prevention layer 36_b_, and can prevent peeling failures between the film and the layer.

In addition, it is particularly preferable that the contact layer 36_a_ contains Ti. Ti is less likely to diffuse into the mounting layer 36_c_ containing Au or the like, and tends to be less likely to be deposited on an upper surface of the mounting layer 36_c_. Therefore, the multilayer electrode 36 including the contact layer 36_a_ containing Ti exhibits suitable adhesion to the intermediate wiring 72 even after the multilayer electrode 36 is exposed to a high temperature environment. In addition, it is particularly preferable that the contact layer 36_a_ contains Ti.

Further, since Ti hardly diffuses into Cr, Ti constituting the contact layer 36_a_ has a property of hardly diffusing into the piezoresistive film 32 containing Cr and Al even in a high temperature environment. Therefore, the piezoresistive film with electrode 30 including the contact layer 36_a_ containing Ti can prevent diffusion of an element in the multilayer electrode 36 into the piezoresistive film 32 even when used in a high temperature environment, and can prevent performance deterioration of the piezoresistive film 32 due to a change in composition.

In addition, the contact layer 36_a_ preferably contains elements among Cr, Ti, Ni, and Mo. In addition, it is preferable that the contact layer 36_a_ is formed of at least one of Cr, Ti, Ni, and Mo. Further, it is particularly preferable that the contact layer 36_a_ is formed of Ti. In addition, it is preferable that the contact layer 36_a_ is formed of elements among Cr, Ti, Ni, and Mo.

Note that, in a case where the contact layer 36_a_, the diffusion prevention layer 36_b_, and the mounting layer 36_c_ are formed of one or more designated elements, it is not excluded that elements other than the designated elements are inevitably or intentionally contained in these layers. In this case, a content ratio of the other elements is, for example, less than 10 at %, preferably less than 3 at %, and more preferably less than 1 at %.

As illustrated in FIG. 2, the diffusion prevention layer 36_b_ is disposed between the contact layer 36_a_ and the mounting layer 36_c_ in the multilayer electrode 36, and is sandwiched between the mounting layer 36_c_ and the contact layer 36_a_ in a vertical direction. The diffusion prevention layer 36_b_ prevents elements contained in a film and a layer disposed below the diffusion prevention layer 36_b_, such as the piezoresistive film 32 and the contact layer 36_a_, from diffusing into the mounting layer 36_c_ disposed above the diffusion prevention layer 36_b_, and from being deposited on the upper surface of the mounting layer 36_c_. Note that the diffusion prevention layer 36_b_ is preferably disposed immediately below the mounting layer 36_c_ even in a case where the piezoresistive film 32 or the multilayer electrode 36 has a multilayer structure of four or more layers.

The diffusion prevention layer 36_b_ can be formed by a thin film method such as sputtering or vapor deposition. A thickness of the diffusion prevention layer 36_b_ is not particularly limited, and is, for example, 1 to 500 nm, and preferably 5 to 50 nm. When the thickness of the diffusion prevention layer 36_b_ is too thin, it becomes difficult to form a continuous film, and a diffusion prevention function may be weakened, and when the thickness is too thick, a problem of film peeling may occur, or a problem of a decrease in productivity (throughput) due to an increase in film deposition time may occur.

The diffusion prevention layer 36_b_ preferably contains a transition element belonging to the fifth or sixth period from the viewpoint of preventing diffusion of an element contained in the piezoresistive film 32, the contact layer 36_a_, or the like into the upper layer. Specifically, the diffusion prevention layer 36_b_ preferably contains one or more elements selected from Y, Zr, Nb, Mo, Tc, Ru, Rh, Pd, Ag, La, Ce, Pr, Nd, Pm, Sm, Eu, Gd, Tb, Dy, Ho, Er, Tm, Yb, Lu, Hf, Ta, W, Re, Os, Ir, Pt, and Au.

In addition, the diffusion prevention layer 36_b_ preferably further contains a platinum group element. Specifically, the diffusion prevention layer 36_b_ preferably contains one or more elements selected from Ru, Rh, Pd, Os, Ir, and Pt. Since the platinum group element has low reactivity and is chemically stable, the diffusion prevention layer 36_b_ containing the platinum group element exhibits a particularly suitable diffusion prevention effect even in a high temperature environment. Note that, among platinum group elements, particularly Pt has a track record of being used in other electrode fields, and has technical accumulation from other platinum group elements.

The diffusion prevention layer 36_b_ is also preferably formed of a transition element belonging to the fifth or sixth period. In addition, the diffusion prevention layer 36_b_ is also preferably formed of a platinum group element.

As illustrated in FIG. 2, the uppermost mounting layer 36_c_ of the multilayer electrode 36 is exposed on the upper surface of the piezoresistive film with electrode 30. The intermediate wiring 72 formed of a thin wire such as Au or Al is bonded to the mounting layer 36_c_ by wire bonding or the like. Note that the pressure sensor 10 using the intermediate wiring 72 formed of a thin wire of Au or Al can be used even in a high temperature environment at a temperature equal to or higher than a melting point of a solder, and has excellent heat resistance. In addition, the pressure sensor 10 using the intermediate wiring 72 formed of a thin wire of Au can improve heat resistance as compared with the pressure sensor using the intermediate wiring 72 formed of a thin wire of Al.

The mounting layer 36_c_ can be formed by a thin film method such as sputtering or vapor deposition. A thickness of the mounting layer 36_c_ is not particularly limited, and is, for example, 10 to 400 nm, and preferably 100 to 300 nm. When the thickness of the mounting layer 36_c_ is too thin, it becomes difficult to form a continuous film, and the adhesion to the intermediate wiring 72 may be deteriorated. When the thickness of the mounting layer 36_c_ is too thick, a problem of film peeling may occur, or a problem of a decrease in productivity (throughput) due to an increase in film deposition time may occur.

The mounting layer 36_c_ preferably contains at least one of Au, Al, and Ni from the viewpoint of heat resistance and bondability with the intermediate wiring 72. In addition, from the viewpoint of enhancing the heat resistance and further enhancing the responsiveness to a high temperature environment, it is more preferable that the mounting layer 36_c_ contains Au having low resistance and a high melting point even in a high temperature environment. In addition, in a case where a thin wire of Au is used as the material of the intermediate wiring 72, the mounting layer 36_c_ contains Au, such that the intermediate wiring 72 and the mounting layer 36_c_ are both formed of Au. As a result, the adhesion of the bonding portion between the intermediate wiring 72 and the mounting layer 36_c_ is improved.

In addition, the mounting layer 36_c_ is preferably formed of at least one of Au, Al, and Ni, and particularly preferably formed of Au.

Next, a method for manufacturing the pressure sensor 10 illustrated in FIG. 1 will be described. In the pressure sensor 10, first, the stem 20 is prepared. A material of the stem 20 is, for example, SUS316 or the like. Next, as illustrated in FIG. 2, the piezoresistive film with electrode 30 is formed on the outer surface 22*b* of the membrane 22 of the stem 20.

In order to form the piezoresistive film with electrode 30, first, the base insulating layer 52 is formed with a predetermined thickness on the outer surface 22*b* of the membrane 22 so as to cover the membrane 22 by a thin film method such as CVD or sputtering (see FIG. 2). Examples of the base insulating layer 52 include a silicon oxide film and a silicon nitride film.

Next, as illustrated in FIG. 2, the piezoresistive film 32 is formed on the surface of the base insulating layer 52. The piezoresistive film 32 is formed by a thin film method such as vapor deposition or sputtering. The shape of the piezoresistive film 32 including the first to fourth resistors R1 to R4 and the electrical wiring 34 is formed by patterning by photolithography or the like.

Next, as illustrated in FIG. 2, the multilayer electrode 36 is formed on the piezoresistive film 32. In a case where the multilayer electrode 36 is formed, a conductive thin film is formed on the piezoresistive film 32 in order of the contact layer 36*a*, the diffusion prevention layer 36*b*, and the mounting layer 36*c*. The contact layer 36*a*, the diffusion prevention layer 36*b*, and the mounting layer 36*c* of the multilayer electrode 36 are formed by a thin film method such as sputtering or vapor deposition.

As illustrated in FIG. 3, the contact layer 36*a*, the diffusion prevention layer 36*b*, and the mounting layer 36*c* included in the multilayer electrode 36 are formed only at predetermined positions on the piezoresistive film 32. The patterning of each layer included in the multilayer electrode 36 can be performed by photolithography or the like similarly to the piezoresistive film 32, but other methods may be used.

As described above, the piezoresistive film 32 and the multilayer electrode 36 are formed in thin films on the base insulating layer 52 formed on the outer surface 22*b* of the membrane 22, such that the piezoresistive film with electrode 30 illustrated in FIG. 3 is formed. In the manufacture of the piezoresistive film with electrode 30, after the piezoresistive film 32 and the multilayer electrode 36 are formed, a heat treatment such as annealing (for example, 350 to 800° C.) may be performed.

A heat treatment is performed at an appropriate temperature after formation of the piezoresistive film 32 and the multilayer electrode 36, such that properties such as a gauge factor of the piezoresistive film 32 can be enhanced. In addition, a heat treatment is performed after the formation of the multilayer electrode 36, such that bondability between the piezoresistive film 32 and each layer inside the multilayer electrode 36 and the multilayer electrode 36 can be enhanced.

Figure 7:
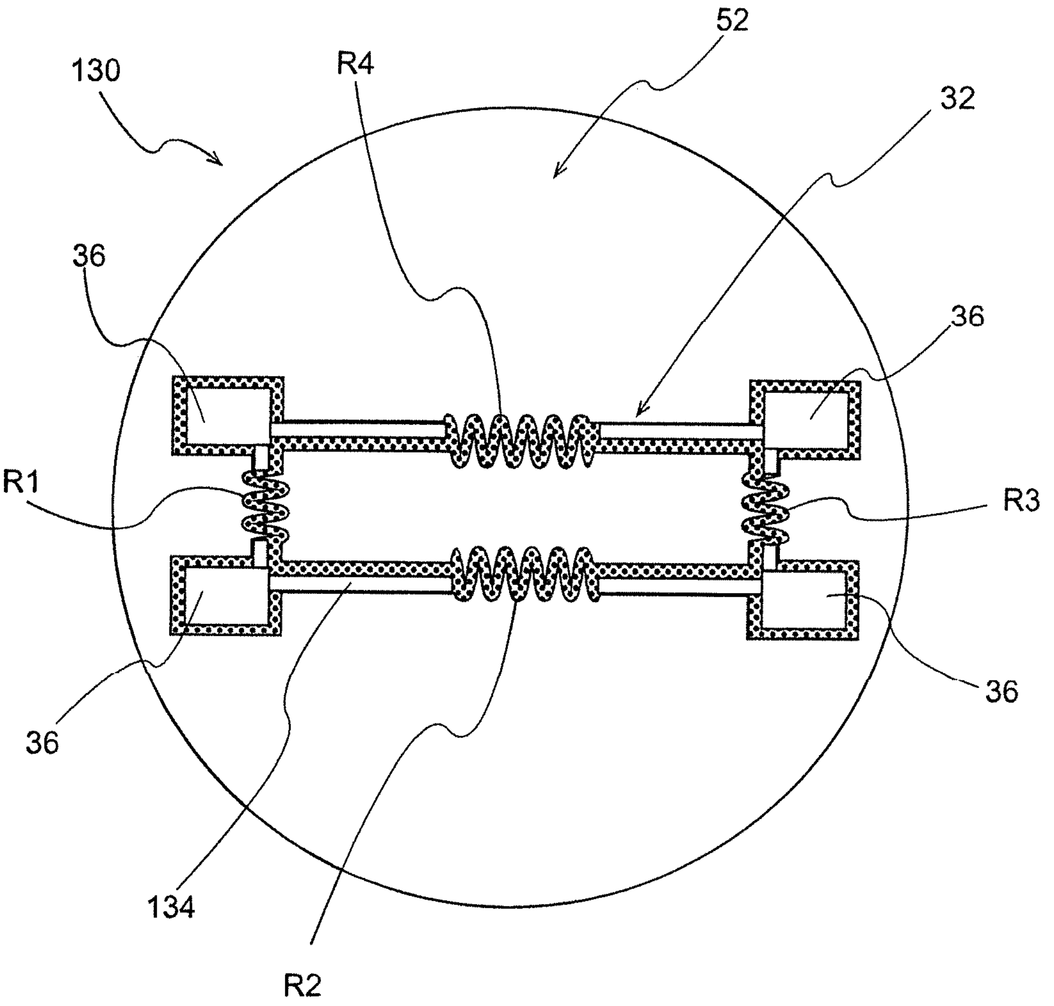
FIG. 7 is a schematic view showing another example of a pattern arrangement of a piezoresistive film with electrode included in the pressure sensor illustrated in FIG. 1.

Note that, like a piezoresistive film with electrode 130 illustrated in FIG. 7, electrical wiring 134 may be produced on the piezoresistive film 32 at the same time of the formation of the multilayer electrode 36 or some layers included in the multilayer electrode 36. In this case, the electrical wiring 134 has the same material and properties as those of the multilayer electrode 36 or a part thereof. When the electrical wiring 134 is formed of the same material as that of the multilayer electrode 36 or a part thereof, a problem that a resistance value of the electrical wiring 34 is affected by distortion can be prevented as compared with a case where a part of the piezoresistive film 32 constitutes the electrical wiring 134 (see FIG. 3). In addition, the electrical wiring 134 having the same material and structure as those of the multilayer electrode 36 has excellent bondability to the piezoresistive film 32, and can prevent peeling failures and the like. However, the electrical wiring 134 may be formed on the base insulating layer 52.

Finally, as illustrated in FIG. 1, the circuit board 16 is fixed to the stem 20 on which the piezoresistive film with electrode 30 is formed, and the intermediate wiring 72 connecting the circuit board 16 and the piezoresistive film with electrode 30 is formed, thereby obtaining the pressure sensor 10. The intermediate wiring 72 is formed by wire bonding using a thin wire of Au or the like.

The multilayer electrode 36 illustrated in FIG. 3 has at least three layers of the contact layer 36*a*, the diffusion prevention layer 36*b*, and the mounting layer 36*c*, and the diffusion prevention layer 36*b* contains a transition element belonging to the fifth or sixth period. The multilayer electrode 36 including such a diffusion prevention layer 36*b* prevents the elements contained in the contact layer 36*a* and the piezoresistive film 32 from interdiffusion into the mounting layer 36*c*, and the reaction of the interdiffused elements at the interface of the mounting layer 36*c* is suppressed, such that the high temperature resistance is improved. In addition, the multilayer electrode 36 exerts excellent adhesive force to the intermediate wiring 72 even after being exposed to a high temperature environment due to the diffusion preventing action of the diffusion prevention layer 36*b*.

Hereinafter, the multilayer electrode 36 and the piezoresistive film with electrode 30 described above will be described in more detail with reference to examples, but the present disclosure is not limited to only examples.

<Sample 1>

On a piezoresistive film 32 containing 70 to 95 at % of Cr and 5 to 30 at % of Al, a contact layer 36*a* formed of Ti, a diffusion prevention layer 36*b* formed of Pt, and a mounting layer 36*c* formed of Au were sequentially formed to have thicknesses of 5 nm, 20 nm, and 200 nm, respectively, as illustrated in FIG. 2 to form a multilayer electrode 36, thereby preparing a sample 1. Each layer of the piezoresistive film 32 and the multilayer electrode 36 was formed by sputtering (see Table 1).

<Samples 2 to 4>

Each of samples was prepared in the same manner as that of the sample 1, except that a thickness of a contact layer 36*a* was 20 nm in the sample 2, a thickness of a diffusion prevention layer 36*b* was 5 nm in the sample 3, and a thickness of a mounting layer 36*c* was 100 nm in the sample 4 (see Table 1).

<Samples 5 to 7>

Each of samples was prepared in the same manner as that of the sample 1, except that a contact layer 36*a* was formed of Cr in the sample 5, a contact layer 36*a* was formed of Ni in the sample 6, and a diffusion prevention layer 36*b* was formed of W in the sample 7 (see Table 1).

<Sample 8>

A sample 8 was prepared in the same manner as that of the sample 1, except that a layer corresponding to the diffusion prevention layer 36*b* was formed of Ni.

<Samples 9 to 15>

Samples 9 to 15 were different from the sample 1 in that the multilayer electrode had a two-layer structure of a mounting layer 36*c* and a contact layer 36*a*, and did not include a diffusion prevention layer 36*b*. The sample 9 includes a contact layer 36*a* formed of Ti and having a thickness of 5 nm, and the sample 10 includes a contact layer 36*a* formed of Ti and having a thickness of 20 nm. The sample 11 includes a contact layer 36*a* formed of Cr and having a thickness of 5 nm, and the sample 12 includes a contact layer 36*a* formed of Cr and having a thickness of 20 nm. The sample 13 includes a contact layer 36*a* formed of Ni and having a thickness of 5 urn, and the sample 14 includes a contact layer 36*a* formed of Ni and having a thickness of 20 nm. The sample 15 has a contact layer 36*a* formed of Mo and having a thickness of 20 m. Each of the samples 9 to 15 has a mounting layer 36*c* formed of Au and having a thickness of 200 nm.

<Evaluation of Samples 1 to 15>

100 samples of each sample were prepared, and an adhesion non-defect rate of wire bonding with an Au thin wire was evaluated. In the evaluation, 25 samples were divided into 4 groups, and the heat treatment conditions performed after the formation of the multilayer electrode 36 and before the wire bonding were set to be different for each group. The first group was not subjected to the heat treatment, the second group was subjected to the heat treatment at 350 degrees for 2 hours, the third group was subjected to the heat treatment at 400 degrees for 2 hours, and the fourth group was subjected to the heat treatment of 500 degrees for 2 hours. Conditions and evaluation results of each sample are shown in Table 1.

condition, and it can be understood that Pt is particularly preferable as an element constituting the diffusion prevention layer 36*b*. In addition, comparison between the sample 1 and the samples 5 and 6 shows that the sample 1 in which the contact layer 36*a* is formed of Ti exhibits a better adhesion non-defect rate of wire bonding than the samples 5 and 6 in which the contact layer 36*a* is formed of Cr or Ni.

The sample 8 in Table I shows an excellent adhesion non-defect rate under the condition where the heat treatment is not performed (AsDepo), but it is found that the adhesion non-defect rate deteriorates as the heat treatment condition becomes higher. In particular, in the samples subjected to the heat treatment at 400° C. and 500° C., many defects in which the wire bonding did not adhere to the surface of the multilayer electrode 36 occurred. In the sample 8 in which the layer corresponding to the diffusion prevention layer 36*b* is formed of Ni which is not a transition element belonging to the fifth or sixth period, it is considered that a sufficient diffusion prevention effect was not obtained in the sample after a heat treatment at 400° C. and 500° C. was performed.

TABLE 1

| | Mounting layer | | Diffusion prevention layer | | Contact layer | | Wire bonding adhesion after annealing | | | |
|---|---|---|---|---|---|---|---|---|---|---|
| Sample No. | Material | Thickness (nm) | Material | Thickness (nm) | Material | Thickness (nm) | As Depo | 350° C. | 400° C. | 500° C. |
| Sample 1 | Au | 200 | Pt | 20 | Ti | 5 | ◎ | ◎ | ◎ | ◎ |
| Sample 2 | Au | 200 | Pt | 20 | Ti | 20 | ◎ | ◎ | ◎ | ○ |
| Sample 3 | Au | 200 | Pt | 5 | Ti | 5 | ◎ | ◎ | ◎ | ○ |
| Sample 4 | Au | 100 | Pt | 20 | Ti | 5 | ◎ | ◎ | ◎ | ○ |
| Sample 5 | Au | 200 | Pt | 20 | Cr | 5 | ◎ | ◎ | ○ | Δ |
| Sample 6 | Au | 200 | Pt | 20 | Ni | 5 | ◎ | ◎ | ○ | Δ |
| Sample 7 | Au | 200 | W | 20 | Ti | 5 | X* | ◎ | ◎ | ◎ |
| Sample 8 | Au | 200 | Ni | 20 | Ti | 5 | ◎ | Δ | X | X |
| Sample 9 | Au | 200 | — | — | Ti | 5 | ◎ | ◎ | Δ | X |
| Sample 10 | Au | 200 | — | — | Ti | 20 | ◎ | Δ | X | X |
| Sample 11 | Au | 200 | — | — | Cr | 5 | ◎ | ○ | X | X |
| Sample 12 | Au | 200 | — | — | Cr | 20 | ◎ | X | X | X |
| Sample 13 | Au | 200 | — | — | Ni | 5 | ◎ | Δ | X | X |
| Sample 14 | Au | 200 | — | — | Ni | 20 | ◎ | X | X | X |
| Sample 15 | Au | 200 | — | — | Mo | 20 | ◎ | ◎ | X | X |

*Film peeling NG

"⊙" (double circle), "○" (circle), "Δ" (trigona), and "x" (cross) in Table I represent the adhesion non-defect rates of the wire bonding of each sample, "⊙" represents the non-defect rate of the top ¼ of the total, and "○" represents the non-defect rate of less than the top ¼ and ½ or more of the total. In addition, "Δ" indicates that the non-defect rate of less than ½ and ¾ or more of the total, and "x" indicates that the non-defect rate of less than ¾ of the total.

The samples 1 to 7 in Table 1 showed excellent adhesion non-defect rates of wire bonding even in the samples after a heat treatment at a high temperature. Note that, in the sample 7 including the diffusion prevention layer 36*b* formed of W, wire bonding adhesion failures due to film peeling occurred under the condition of not performing a heat treatment (AsDepo), but other samples after a high temperature heat treatment showed an excellent adhesion non-defect rate. From this result, it is found that the diffusion prevention layer 36*b* formed of W which is a transition element belonging to the fifth or sixth period but is not a platinum group element can prevent film peeling by an appropriate heat treatment, and exhibits an excellent adhesion non-defect rate of wire bonding.

The samples 1 to 6 in Table 1 show excellent adhesion non-defect rates of wire bonding under any heat treatment The samples 9 to 15 in Table 1 show an excellent adhesion non-defect rate under the condition where the heat treatment is not performed (AsDepo), but it is found that the adhesion non-defect rate deteriorates as the heat treatment condition becomes higher. In these samples without the diffusion prevention layer 36*b*, it is considered that elements of the piezoresistive film 32 or the contact layer 36*a* were deposited on the surface of the mounting layer 36*c* by a heat treatment at a high temperature, and defects frequently occurred in which thin wires of wire bonding did not adhere to the surface of the multilayer electrode.

<Difference Between Results of Samples 1 and 5>

Figure 4B:
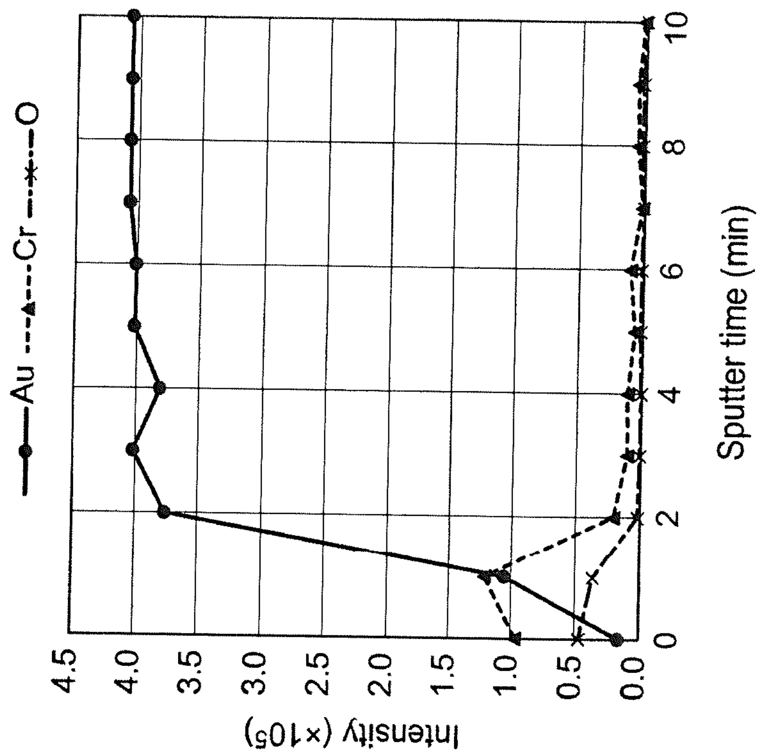
FIGS. 4A and 4B are graphs showing a difference in diffusion state of an element depending on the presence or absence of a diffusion prevention layer.
Figure 4A:
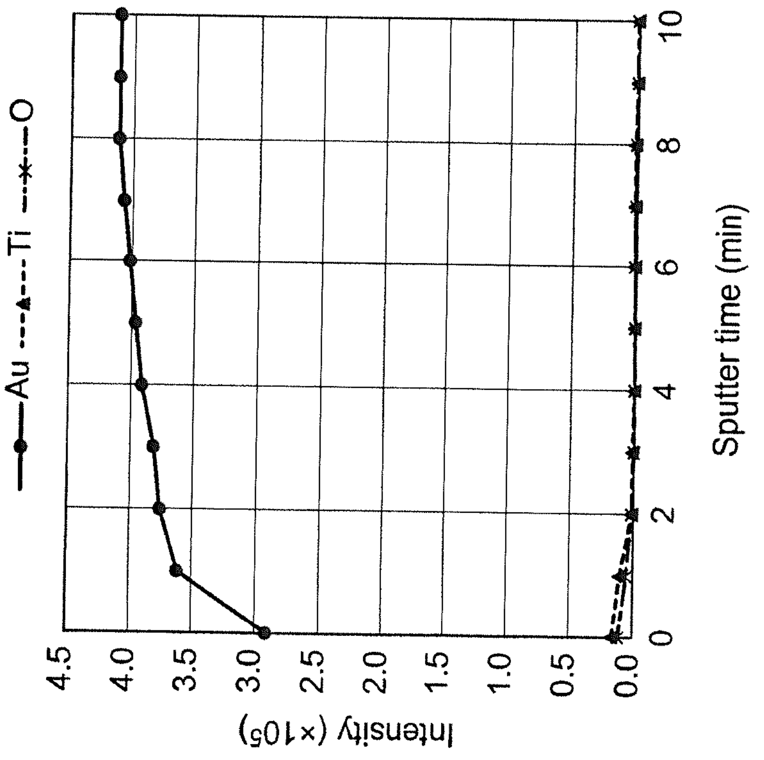

FIG. 4A illustrates a sample having a three-layer structure in which a thin film of Ti (thickness: 5 nm) and a thin film of Au (thickness: 200 nm) are formed on a thin film (thickness: 300 nm) containing 70 to 95 at % of Cr and 5 to 30 at % of Al, and after a heat treatment at 350° C. for 2 hours, elements in the vicinity of the upper surface of the sample again are analyzed by XPS (ESCA).

In addition, FIG. 4B illustrates a sample having a three-layer structure in which a thin film of Cr (thickness: 5 nm) and a thin film of Au (thickness: 200 nm) are formed on a thin film (thickness: 300 nm) containing 70 to 95 at % of Cr and 5 to 30 at % of Al, and after a heat treatment at 350° C.

for 2 hours, elements in the vicinity of the upper surface of the sample again are analyzed by XPS (ESCA). Note that, in FIGS. 4A and 4B, the horizontal axis represents the sputter time (min), and the vertical axis represents the intensity.

Here, it can be understood that in FIG. 4A, Ti in the lower layer is hardly present on the sample surface, and a large amount of Au is present, whereas in FIG. 4B, a large amount of Cr or oxygen is present on the sample surface, and the amount of Au is small. From the comparison between FIGS. 4A and 4B, it can be understood that Ti is less likely to diffuse into Au than Cr, and the problem of segregation on the surface of the Au layer after the heat treatment is less likely to occur. In addition, it is considered that this corresponds to that, in the results shown in Table 1, the sample 1 in which the contact layer 36*a* is formed of Ti shows a more excellent wire bonding adhesion non-defect rate than the sample 5 in which the contact layer 36*a* is formed of Cr.

<Other Reasons why Ti is Preferred as Contact Layer 36*a*>

Figure 5B:
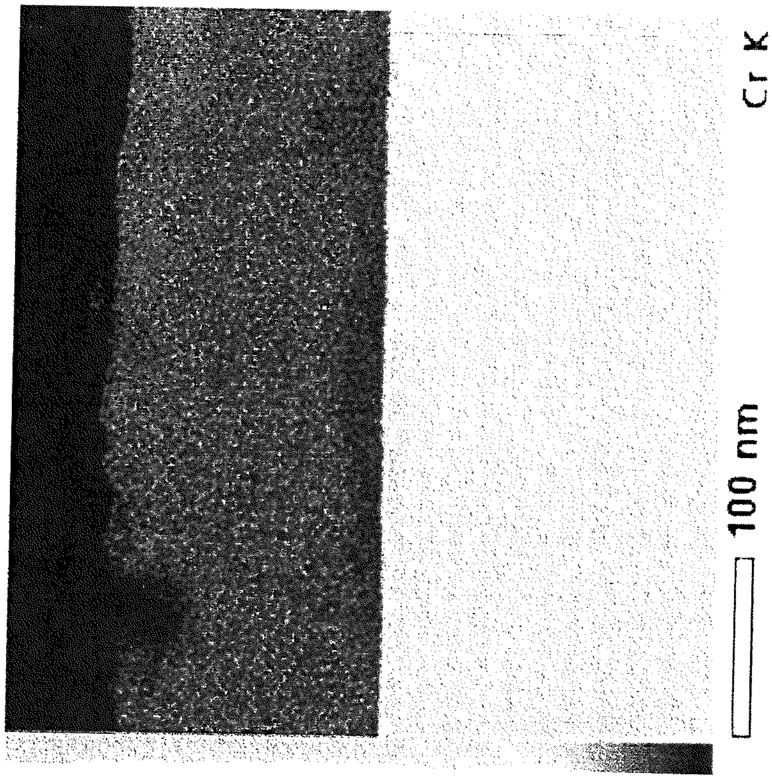
FIGS. 5A and 5B are photomicrographs showing that diffusion of Cr is prevented by a diffusion prevention layer.
Figure 5A:
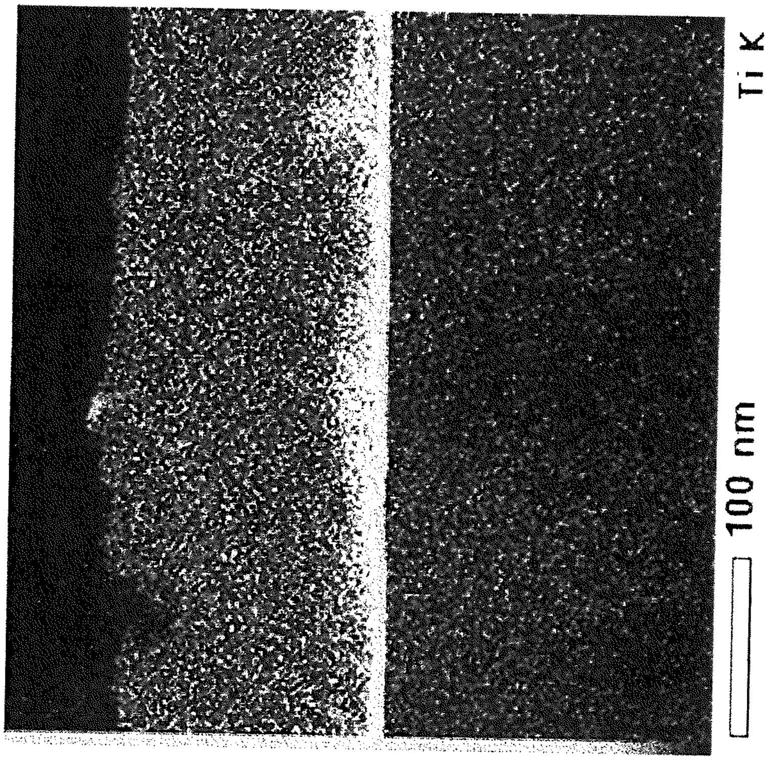

In FIGS. 5A and 5B, a thin film formed of Ti and a thin film formed of Au were formed on a thin film formed of Cr at thicknesses of 5 nm and 200 nm, respectively, to prepare a sample having a three-layer structure, and the sample was subjected to a heat treatment at 350° C. for 2 hours, and then a cross section of the sample was subjected to elemental analysis by SEM-EDS. FIG. 5A illustrates the presence position of Ti in white, and FIG. 5B illustrates the presence position of Cr in white.

From FIG. 5A, it can be understood that a large amount of Ti which is present at the center in the vertical direction of the sample slightly spreads to the Au side of the upper layer to form a mixed region, but hardly spreads in Cr of the lower layer to form a sharp boarder. In addition, from the comparison between FIGS. 5A and 5B, it can be understood that Cr is hardly present at the center in the vertical direction of the sample in which a large amount of Ti is present.

It can be understood from FIGS. 5A and 5B that Ti and Cr are hardly interdiffused, and it is considered that a change in composition of the piezoresistive film 32 in a high temperature environment can be prevented by using Ti as a material of the contact layer 36*a*.

<Preferred Content Ratios of Cr and Al in Piezoresistive Film>

Figure 6:
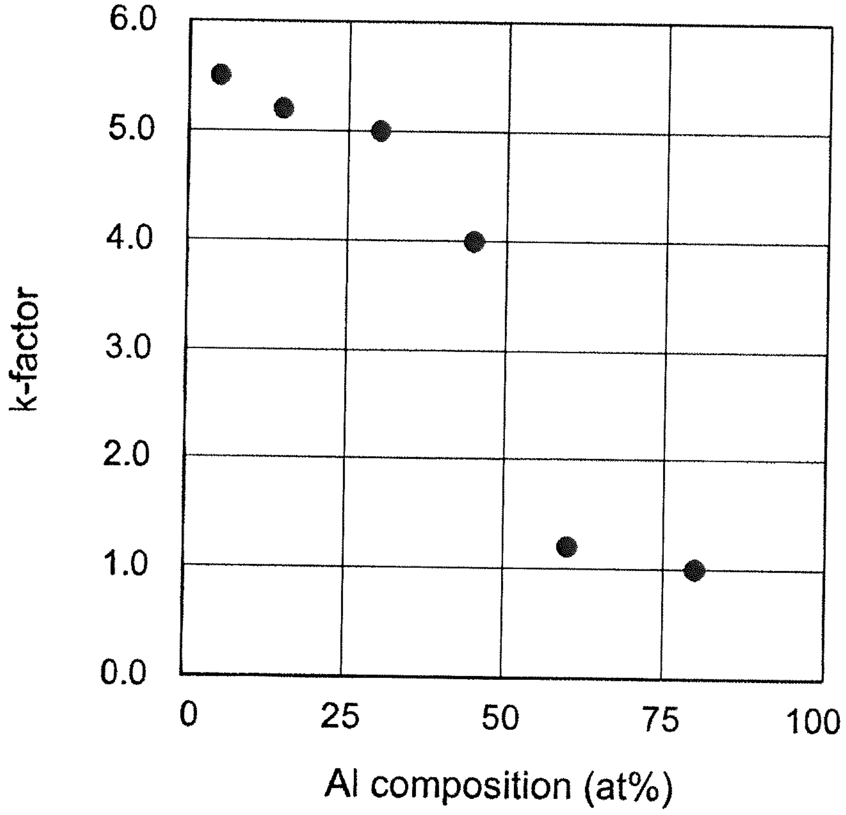
FIG. 6 is a graph showing a change in gauge factor due to a change in composition of a piezoresistive film.

FIG. 6 illustrates a relationship between a difference in composition of the piezoresistive film 32 and a change in gauge factor of the piezoresistive film 32 for the piezoresistive film with electrode 30 illustrated in FIGS. 2 and 3. As for the piezoresistive film with electrode 30 used for the evaluation, a piezoresistive film 32 containing Cr and Al was formed on a Si wafer having a thermal oxide film by sputtering, and then a contact layer 36*a* (Ti, 5 nm), a diffusion prevention layer 36*b* (Pt, 20 nm), and a mounting layer 36*c* (Au, 200 nm) were formed by electron beam evaporation to form a multilayer electrode 36. As described below, 6 samples of the piezoresistive films with electrode 30 with different compositions of the piezoresistive films 32 were prepared, and for each sample, the gauge factor was measured by a bending test of a cantilever beam. Note that the composition of the piezoresistive film 32 was adjusted by changing a Cr/Al ratio of a sputtering target.

<Sample 1> Al: 5 at %, Cr: 95 at %
<Sample 2> Al: 15 at %, Cr: 85 at %
<Sample 3> Al: 30 at %, Cr: 70 at %
<Sample 4> Al: 45 at %, Cr: 55 at %
<Sample 5> Al: 60 at %, Cr: 40 at %
<Sample 6> Al: 80 at %, Cr: 20 at %

In FIG. 6, the horizontal axis represents the content ratio of Al (Al composition (at %)), and the vertical axis represents the gauge factor (K-factor). As illustrated in FIG. 6, it can be understood that the piezoresistive film with electrode 30 has a high gauge factor in a region where the content ratio of Al is lower than the content ratio of Cr. Therefore, from the viewpoint of increasing the gauge factor, it can be understood that the piezoresistive film 32 preferably contains 50 to 99 at % of Cr and 1 to 50 at % of Al, and more preferably contains 70 to 95 at % of Cr and 5 to 30 at % of Al.

Although the multilayer electrode 36, the piezoresistive film with electrode 30, and the pressure sensor 10 according to the present disclosure have been described above with reference to the embodiments and examples, the present disclosure is not limited only to these embodiments and examples. It goes without saying that the present disclosure includes many other embodiments and modifications in addition to the embodiments and examples described above. For example, the pressure sensor 10 is not limited to the pressure sensor including the stem 20 as illustrated in FIG. 1, and may be a pressure sensor in which the piezoresistive film with electrode 30 is formed on a tabular substrate. Examples of the material of the substrate include Si and alumina ($Al_2O_3$).

As understood from the description described above, the present specification discloses the following.

[Supplementary Note 1]

A multilayer electrode according to the present disclosure includes a contact layer capable of being superposed on a piezoresistive film, a diffusion prevention layer superposed on the contact layer, and a mounting layer superposed on the diffusion prevention layer, in which the diffusion prevention layer contains a transition element belonging to the fifth or sixth period.

The multilayer electrode according to the present disclosure includes at least three layers of a contact layer, a diffusion prevention layer, and a mounting layer. The contact layer can be superposed on the piezoresistive film. The diffusion prevention layer containing a transition element belonging to the fifth or sixth period prevents the elements contained in the contact layer and the superposed piezoresistive film from interdiffusing into the mounting layer. In the multilayer electrode including such a diffusion prevention layer, the reaction of the interdiffused elements at the interface of the mounting layer is suppressed, such that high temperature resistance is improved, and excellent adhesive force to the wiring is exhibited even after the multilayer electrode is exposed to a high temperature environment.

[Supplementary Note 2]

For example, the diffusion prevention layer may contain a platinum group element.

When the diffusion prevention layer contains a chemically stable platinum group element, interdiffusion between the films and between the layers in the superposed piezoresistive film and the multilayer electrode can be effectively prevented. In addition, the reaction of the interdiffused elements at the interface of the mounting layer can also be effectively suppressed.

[Supplementary Note 3]

In addition, the contact layer may contain, for example, at least one of Cr, Ti, Ni, and Mo.

In addition, the contact layer may contain, for example, Ti.

Since the elements contained in such a contact layer easily form an alloy with another metal element, it is effective for securing adhesion strength between films and between layers to prevent film peeling failures. In addition, in particular, Ti has a property of being relatively difficult to diffuse into the piezoresistive film in a case where the superposed piezoresistive film contains Cr and Al, and interdiffusion into the mounting layer is effectively prevented by the diffusion prevention layer containing the transition element belonging to the fifth or sixth period. Further, Ti is less likely to diffuse into the surface of the mounting layer containing Au or the like, and is less likely to be deposited on the upper surface of the mounting layer. Therefore, the multilayer electrode including such a contact layer can effectively prevent interdiffusion between the respective films and between the respective layers in the superposed piezoresistive film and the multilayer electrode. In addition, the multilayer electrode including such a contact layer prevents a change in properties of the superposed piezoresistive film in a high temperature environment, improves high temperature resistance, and exhibits significantly excellent adhesive force to wiring even after being exposed to the high temperature environment.

[Supplementary Note 4]

In addition, the mounting layer may contain, for example, Au.

When the mounting layer contains Au, the adhesion of the mounting layer to the Au wiring having excellent heat resistance is particularly excellent. Therefore, the multilayer electrode including such a mounting layer has improved high temperature resistance and exhibits excellent adhesive force to wiring.

[Supplementary Note 5]

In addition, the piezoresistive film with electrode according to the present disclosure includes a piezoresistive film containing Cr and Al, a multilayer electrode according to any one of the above, which is provided on the piezoresistive film by superposing the contact layer on the piezoresistive film, and the piezoresistive film.

[Supplementary Note 6]

In addition, the pressure sensor according to the present disclosure includes a piezoresistive film containing Cr and Al, a multilayer electrode according to any one of the above, which is provided on the piezoresistive film by superposing the contact layer on the piezoresistive film, the piezoresistive film, and a membrane provided with the piezoresistive film.

That is, the multilayer electrode is provided on the piezoresistive film and is used as a piezoresistive film with electrode. In addition, such a multilayer electrode and a piezoresistive film are provided on a membrane or the like to constitute a pressure sensor exhibiting, for example, excellent resistance even in a high temperature environment.

[Supplementary Note 7]

In addition, for example, the piezoresistive film may contain 50 to 99 at % of Cr and 1 to 50 at % of Al.

Such a piezoresistive film has a stable high gauge factor in a wide temperature range, and the diffusion prevention layer of the multilayer electrode effectively prevents interdiffusion of Cr having a high content ratio in the piezoresistive film into the mounting layer, thereby realizing a multilayer electrode that exhibits excellent adhesive force.

REFERENCE SIGNS LIST

10 Pressure sensor
12 Connecting member
12*a* Screw groove
12*b* Flow path
14 Pressing member
16 Circuit board
20 Stem
21 Flange portion
22 Membrane
22*a* Inner surface
22*b* Outer surface
30 Piezoresistive film with electrode
32 Piezoresistive film
R1 First resistor
R2 Second resistor
R3 Third resistor
R4 Fourth resistor
34 Electrical wiring
36 Multilayer electrode for piezoresistive film (multilayer electrode)
36*a* Contact layer
36*b* Diffusion prevention layer
36*c* Mounting layer
52 Base insulating layer
72 Intermediate wiring

What is claimed is:

1. A multilayer electrode comprising:
a contact layer capable of being superposed on a piezoresistive film;
a diffusion prevention layer superposed on the contact layer; and
a mounting layer superposed on the diffusion prevention layer,
wherein the diffusion prevention layer contains a transition element belonging to a fifth or a sixth period, and the mounting layer contains Au.

2. The multilayer electrode according to claim 1, wherein the diffusion prevention layer contains a platinum group element.

3. The multilayer electrode according to claim 1, wherein the contact layer contains at least one of Cr, Ti, Ni, and Mo.

4. The multilayer electrode according to claim 1, wherein the contact layer contains Ti.

5. A piezoresistive film with electrode, comprising:
a piezoresistive film; and
the multilayer electrode according to claim 1 provided on the piezoresistive film by superposing the contact layer on the piezoresistive film.

6. The piezoresistive film with electrode according to claim 5, wherein the piezoresistive film contains Cr and Al.

7. The piezoresistive film with electrode according to claim 5, wherein the piezoresistive film contains 50 to 99 at % of Cr and 1 to 50 at % of Al.

8. A pressure sensor comprising:
(i) a piezoresistive film;
(ii) a multilayer electrode comprising:
a contact layer capable of being superposed on the piezoresistive film;
a diffusion prevention layer superposed on the contact layer; and a mounting layer superposed on the diffusion prevention layer, and the diffusion prevention layer containing a transition element belonging to a fifth or a sixth period;
the multilayer electrode being on the piezoresistive film by superposing the contact layer on the piezoresistive film; and
(iii) a membrane on which the piezoresistive film is provided,
wherein the piezoresistive film contains Ct and Al.

9. The pressure sensor according to claim 8, wherein the piezoresistive film contains 50 to 99 at % of Cr and 1 to 50 at % of Al.

* * * * *